H. T. MARTIN.
ROTARY CHURN.
APPLICATION FILED AUG. 26, 1911.
1,020,300.
Patented Mar. 12, 1912.
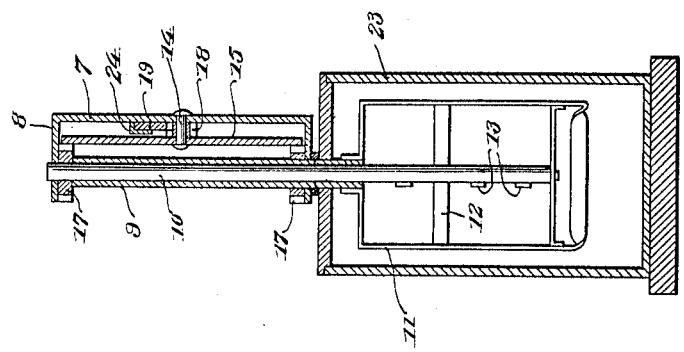
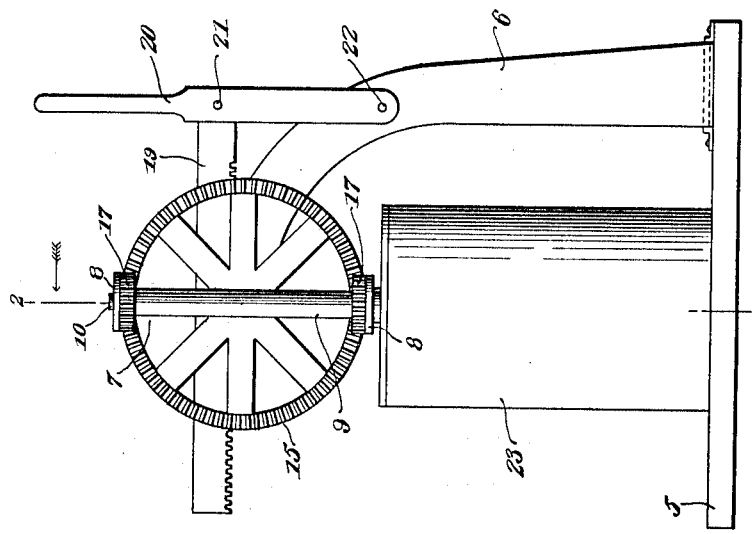
Witnesses
J. H. Crawford
Inventor
Harry T. Martin,
By Victor J. Evans
Attorney

UNITED STATES PATENT OFFICE.

HARRY T. MARTIN, OF PANHANDLE, TEXAS.

ROTARY CHURN.

1,020,300.  Specification of Letters Patent.  Patented Mar. 12, 1912.

Application filed August 26, 1911. Serial No. 646,095.

*To all whom it may concern:*

Be it known that I, HARRY T. MARTIN, a citizen of the United States, residing at Panhandle, in the county of Carson and State of Texas, have invented new and useful Improvements in Rotary Churns, of which the following is a specification.

The invention relates to churns, and more particularly to the class of rotary dasher churns.

The primary object of the invention is the provision of a churn in which there is arranged a pair of rotatable dasher blades, the same being driven from a common gear controlled through the medium of a manually operable lever.

Another object of the invention is the provision of a churn which is simple in construction, thoroughly efficient in operation, and inexpensive in manufacture.

With these and other objects in view, the invention consists in the construction, combination and arrangement of parts, as will be hereinafter more fully described, illustrated in the accompanying drawings, and pointed out in the claims hereunto appended.

In the drawings: Figure 1 is a side elevation of a churn constructed in accordance with the invention. Fig. 2 is a sectional view on the line 2—2 of Fig. 1.

Similar reference characters indicate corresponding parts throughout the several views of the drawings.

Referring to the drawings by numerals, the churn comprises a base 5, to which is fixed a crane 6, the latter being formed at its free end with a vertical head 7 provided with laterally extending spaced bearings 8, in which are journaled outer and inner dasher shafts 9 and 10, respectively, the inner shaft 10 being solid while the outer shaft 9 is hollow, said inner shaft extending through the outer shaft, the outer shaft being provided with a dasher frame 11 carrying transverse dasher blades 12, and likewise the shaft 10 carries dasher blades 13, the shafts being adapted to rotate in a reverse direction, in a manner presently described.

Fixed in the head 7, medially between the bearings 8, is a stationary stud axle 14, on which is journaled a crown gear 15, the same meshing with pinions 17 fixed to the inner and outer shafts, respectively. The crown gear 15 is formed with a rack pinion 18, with which engages a toothed rack bar 19, the latter being connected to an operating lever 20 by means of a pivot 21, the said lever being connected to the crane 6 by means of a pivot 22, so that upon rocking the said lever 20 on its pivot 22, the rack bar 19 will be reciprocated, thereby causing the crown gear 15 to be turned in reverse directions on a continuity of reciprocation of the said rack bar. Thus in this manner the dasher shafts 9 and 10 will be rotated in reverse directions to each other, as will be clearly obvious. Adapted to be removably mounted upon the base 5 is a suitable churn body 23, into which extend dashers, so that when the same are operating, the blades 12 and 13 will move in reverse directions to each other, thereby acting on the cream or milk to throw the same in contrary directions and consequently agitate the contents of the churn body, so as to quickly produce butter.

Fixed in the head 7 on the crane 6 and engaging the rack bar 19 is a guide lug 24, the same preventing the possibility of any lateral displacement of the rack bar, and also obviating the possibility of the said bar jumping or leaving the rack pinion on the crown gear, when the latter is being turned. The lower end of the inner shaft 10 is formed with a reduced portion 24', the same engaging in a suitable aperture formed in the lower end of the dasher frame 11, so as to prevent any displacement of the inner shaft with respect to said dasher frame.

What is claimed is:

1. In a churn, a base, on which is adapted to be removably mounted a churn, a crane fixed to and rising from the base and having a head provided with laterally spaced bearings, a hollow dasher shaft journaled in one bearing, a solid dasher shaft extending through the hollow shaft and journaled in the other bearing, a dasher frame fixed to the lower end of the hollow shaft, dasher blades fixed to the frame and the said solid shaft, pinions fixed to the shafts respectively, a gear rotatably connected with the head and meshing with the said gear, a rack pinion formed on the gear, a reciprocating rack bar meshing with said rack pinion, and an oscillatory lever pivoted to the crane and the said rack bar.

2. In a churn, a base, on which is adapted to be removably mounted a churn, a crane fixed to and rising from the base and having a head provided with laterally spaced bearings, a hollow dasher shaft journaled in one bearing, a solid dasher shaft extending through the hollow shaft and journaled in the other bearing, a dasher frame fixed to the lower end of the hollow shaft, dasher blades fixed to the frame and the said solid shaft, pinions fixed to the shafts respectively, a gear rotatably connected with the head and meshing with the said gear, a rack pinion formed on the gear, a reciprocating rack bar meshing with said rack pinion, an oscillatory lever pivoted to the crane and the said rack bar, and means on the head and engaging the rack bar to prevent the same from disengaging from the rack pinion.

In testimony whereof I affix my signature in presence of two witnesses.

HARRY T. MARTIN.

Witnesses:
M. K. CALLISON,
W. T. FORD.

Copies of this patent may be obtained for five cents each, by addressing the "Commissioner of Patents, Washington, D. C."